H. B. SOMMERS.
Ditching-Plow.

No. 5,148. Patented June 5, 1847.

UNITED STATES PATENT OFFICE.

HENRY B. SOMMERS, OF GREENFIELD, INDIANA.

IMPROVEMENT IN TURF-PLOWS.

Specification forming part of Letters Patent No. 5,148, dated June 5, 1847; antedated December 5, 1846.

*To all whom it may concern:*

Be it known that I, HENRY B. SOMMERS, of Greenfield, in the county of La Grange and State of Indiana, have invented a new and useful Machine for Plowing in Marshy Lands and other Wet Grounds, which I denominate a "Turf-Excavator;" and I do hereby declare that the following is a full and exact description thereof.

Figure 1:
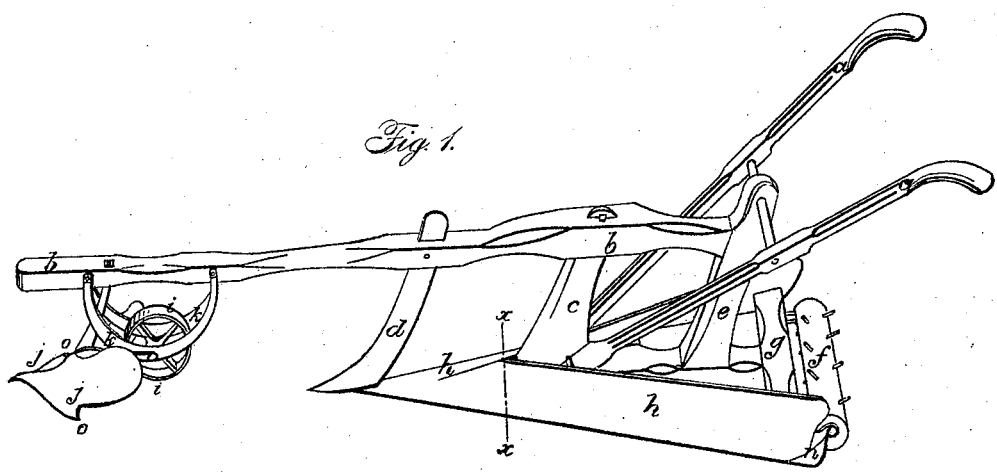
Figure 2:

In the accompanying drawings, Figure 1 is a perspective representation of my machine, and Fig. 2 a sectional view of the colters or longitudinal knives that cut and throw off the turf or sward.

$a\,a$ are the handles, and $b\,b$ the beam, of the machine, which are like those of the ordinary plow.

$c$, $e$, and $g$ are timbers that constitute a part of the frame-work.

$d$ is a colter of the ordinary kind.

$h\,h$ are shares or longitudinal knives, that are concave on their surfaces, as shown distinctly in Fig. 2, which is a vertical section of them in the line $x\,x$ of Fig. 1, being at the point where the two meet together. At their rear ends these longitudinal knives have cutters $n\,n$ attached to their outer angles, which rise vertically from them, and serve to divide the sward. The colters or longitudinal knives $h\,h$ throw off the sward and earth and form it into ridges, performing, to some extent, the office of the mold-board of a plow on each side of the machine. In the rear of these longitudinal knives I place a roller, $f$, which revolves on gudgeons, the sockets of which may be attached to the piece $g$ of the frame. This roller is furnished with teeth, which serve to tear, divide, and level the boggy or earthy matter, and fit it the more perfectly for the receiving of grass or other seed, should such be intended to be sown thereon.

Near the fore end of the beam I place a wheel, $i\,i$, for the purpose of keeping the machine at a proper level. The gudgeons of this wheel run in the semicircles $k\,k$, and in front of this wheel I place a double share, $j\,j$, that serves to clear a track for the wheel $i\,i$. I form this double share with projecting corners $o\,o$. Its edge should be made of steel and kept sharp.

Having thus fully described the manner in which I construct my turf-excavator, I hereby declare that I do not claim either of the individual parts thereof, when taken alone; but

What I do claim is—

1. The above-named toothed roller, $f$, in combination with the shares $h\,h$, operating in the manner and for the purpose described.

2. The forward cutter, $d$, in combination with the wheel $i\,i$, and shares $h\,h$ for leveling the bogs or turf, in the manner described.

3. The vertical cutters $n\,n$, in combination with the shares $h\,h$, for separating the furrow from the land border, as described.

H. B. SOMMERS.

Witnesses:
THOS. P. JONES,
WM. J. DONOHOO.